Aug. 30, 1932. D. C. KLAUSMEYER 1,875,016
POWER BRAKED MOBILE DRILL
Original Filed Oct. 8, 1924  2 Sheets-Sheet 1
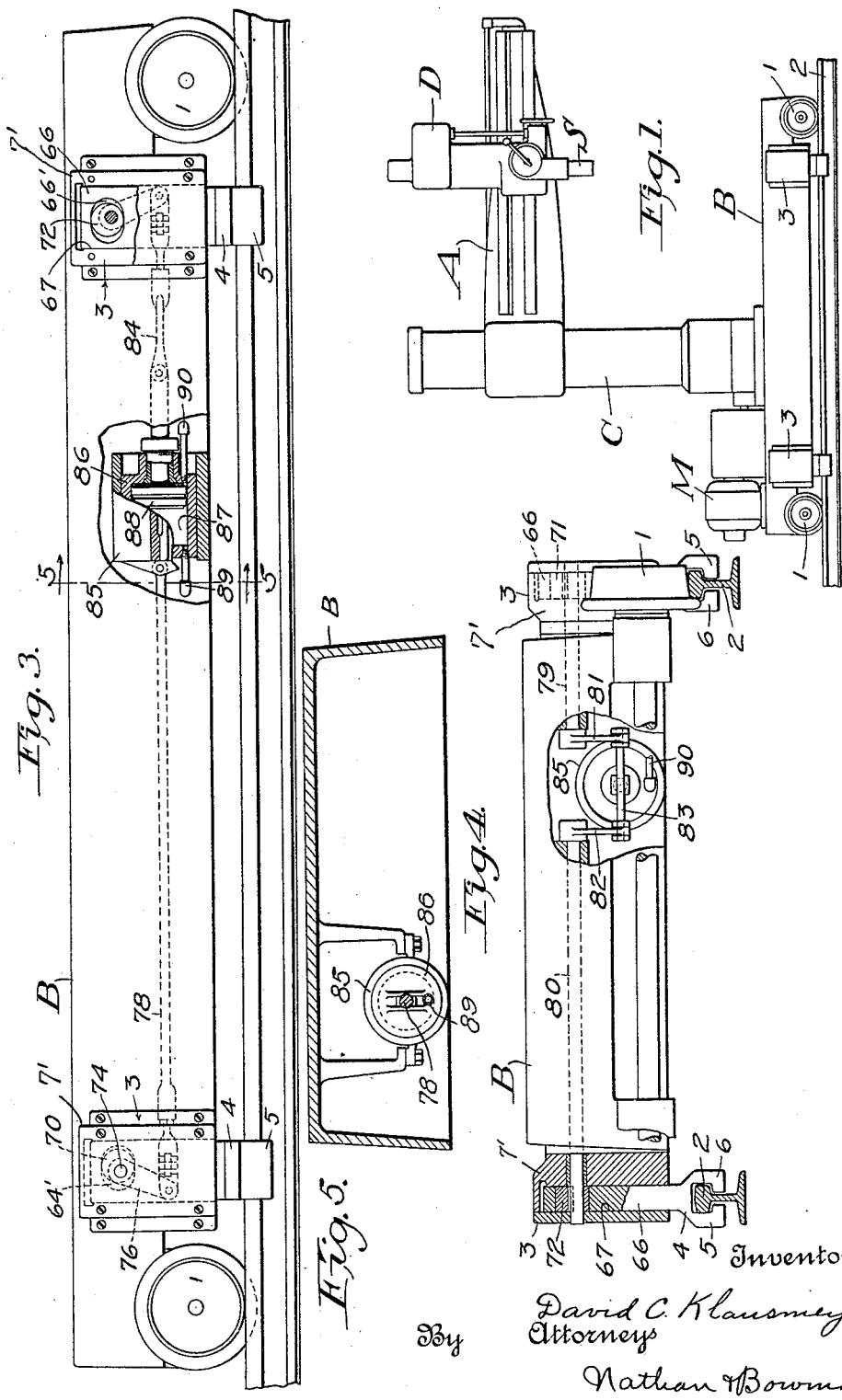
Inventor
David C. Klausmeyer
By Attorneys
Nathan Bowman

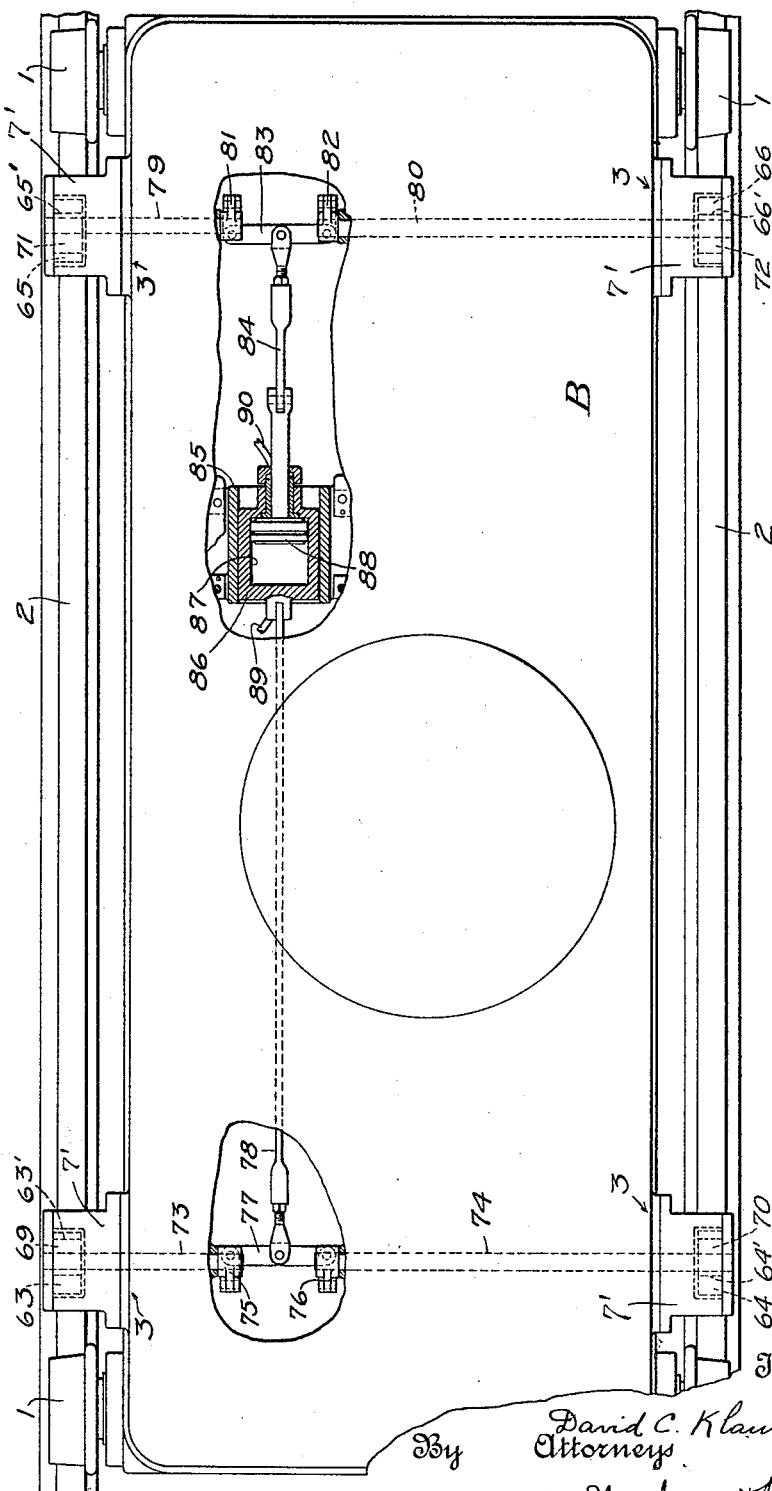

Patented Aug. 30, 1932

1,875,016

UNITED STATES PATENT OFFICE

DAVID C. KLAUSMEYER, OF CINCINNATI, OHIO, ASSIGNOR TO THE CINCINNATI BICKFORD TOOL COMPANY, OF OAKLEY, CINCINNATI, OHIO, A CORPORATION OF OHIO

POWER BRAKED MOBILE DRILL

Original application filed October 8, 1924, Serial No. 742,376. Divided and this application filed May 1, 1928. Serial No. 274,258.

This invention relates to machine-tools and more particularly to means for facilitating the transportation of machine-tools from one place to another and for securely maintaining them in any desired location.

Usually machine-tools are maintained in a fixed position, being secured upon a suitable foundation or floor, and the work to be operated on is brought to the machine-tool. There are, however, certain times and conditions, such as when very large work is to be machined, which make it desirable to have the machine-tool capable of being moved bodily, whereby it may be taken to the work, may be moved relatively thereto during a machining operation, or for any other reason may be moved about the plant.

This invention therefore has for an object so to construct a normally stationary type of machine-tool that it readily may be moved from one place to another.

Another object of this invention is to provide means for securely maintaining the machine-tool in any desired location and to hold it against strains tending to overturn it.

A further object of the invention is to provide a plurality of locking devices to hold a machine-tool in any desired location and to provide fluid pressure actuated means for actuating the locking devices.

Still another object is to provide a plurality of fluid pressure actuated locks for holding a machine-tool against movement and so to control the distribution of power thereto that all of the locks will be actuated simultaneously and to the same degree.

A radial-drill is one type of machine-tool to which the present invention is adaptable and the invention will therefore be disclosed in connection with such a machine-tool merely as one practical embodiment thereof. It is to be understood, however, that the invention is likewise adaptable to various other types of machine-tools.

These objects have been attained in a machine-tool constructed with a base which supports the various other parts of the tool and which may also carry the power means for actuating the machine-tool. This base is not, as is customary, provided with means to anchor the machine-tool down permanently but inasmuch as it is adapted to be moved relatively to the work or from place to place, it is preferably provided with means to facilitate such transportation. This means may consist of suitable wheels, rollers or other anti-friction devices and these devices are preferably caused to co-operate with a permanent way, such, for example, as spaced tracks which may be laid to any desired destination. Thus the machine-tool is so supported that it may be moved, under any suitable power, relative to the work or to any part of the plant.

The machine-tool having been moved to any desired place it is necessary that it be firmly secured in its new position to prevent its movement during the operation thereof. This invention therefore provides suitable locking devices which, when suitably actuated, serve to secure the machine-tool against movement and to prevent its overturning. These locking devices may conveniently comprise a plurality of friction-clamps adapted to engage either the permanent way or any other suitable stationary object, and fluid pressure actuated means is provided for actuating the clamps. The fluid pressure to actuate all of the clamps is preferably obtained from a single source and suitable equalizing devices are located intermediate the source of power and the clamps to cause power to be evenly distributed to all of said clamps whereby the gripping action of all of them will be the same.

This application is a division of my pending application Serial No. 742,376 filed October 8, 1924.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of a mobile radial drill embodying the present invention. Fig. 2 is a plan of a radial drill base partly broken away better to show my improved fluid pressure actuated means for actuating the plurality of clamps. Fig. 3 is a side view of Fig. 2, certain parts being broken away better to illustrate the invention. Fig. 4 is an end view of Fig. 3, also with certain parts broken away. Fig. 5 is a detail section on the line 5—5 of Fig. 3.

Referring more particularly to the drawings the invention is disclosed as associated with a radial drill comprising a column C, radial-arm A and the usual drill-head D adjustably mounted on the arm. Within the drill-head is journaled a spindle S adapted to receive a drill-point or other suitable tool. Power to translate the arm vertically on the column and to rotate the spindle may be provided by a motor M, or other prime-mover, preferably located at the foot of the column and such power may be controlled by suitable mechanism which, being conventional, need not be described. Machine-tools of this type are usually provided with or mounted upon a base which in turn is secured to a suitable stationary foundation or floor. A base of this nature is illustrated at B which, however, when used in connection with the present invention is not permanently secured in any definite position but which instead is adapted to be moved relative to its support. This invention relates particularly to the means permitting transportation of the base and means for securing it either temporarily or permanently in any desired location. Obviously any type of machine-tool could be so mounted, transported and secured in position, therefore it is to be understood that the invention is adaptable to various other machine-tools and is not limited to radial-drills.

To facilitate the transportation of the machine its base is preferably provided with suitable anti-friction devices such, as for example wheels or rollers 1. Preferably these anti-friction devices are guided to move in a predetermined path. This may conveniently be accomplished by forming the wheels with side flanges and fitting them upon suitable tracks such as the rails 2. Adjacent the wheels 1 the base is provided with locking devices 3 which, when the base and the machine-tool thereon has been moved to any desired location, may be actuated to secure the base to some immovable object such as, for example, the rails 2. These locking devices preferably comprise vertically movable clamping blocks 4 having jaws 5 and 6 arranged at opposite sides of the rail web and adapted upon upward movement to engage the under-side of the head of the rail 2. Thus the rail-head is gripped between the lower surface of the wheels 2 and the jaws 5 and 6 and the machine base is held against movement both vertically and horizontally.

The clamping blocks are preferably formed upon the lower ends of slide blocks 63, 64, 65 and 66 vertically movable in guideways 67 formed in heavy brackets 7' secured to the base B adjacent its four corners. Adjacent their upper ends the blocks 63, 64, 65 and 66 are formed with apertures 63', 64', 65' and 66' respectively, within which are fitted eccentrics 69, 70, 71 and 72. The eccentrics 69 and 70 are carried by co-axial shafts 73 and 74 journaled in bearings carried by the base and to these shafts are secured rock-arms 75 and 76 respectively. An equalizing bar 77 is pivotally connected at its opposite ends with the rock-arms 75 and 76 and serves, when moved in one direction under the influence of a connecting rod 78, to oscillate the shafts 73 and 74 thereby to lift the blocks 63 and 64 and close the clamps with equal pressure. The eccentrics 71 and 72 are secured upon shafts 79 and 80 carrying rock-arms 81 and 82 likewise connected together by an equalizing bar 83 pivoted intermediate its ends to a connecting rod 84. The connecting rods 78 and 84 may be moved lengthwise, to effect the closing and opening of the clamps, by fluid actuated means now to be described.

Supported from the underside of the upper wall of the base B is a cylinder 85 within which is slidably mounted a second cylinder 86 having a pivotal connection with the connecting rod 78. The cylinder 86 provides an internal bore 87 within which is slidingly fitted a piston 88 operatively connected with the connecting rod 84. The cylinder 86 and its co-operative piston 88 constitute an equalizing fluid actuated motor which actuates all of said locking devices. Fluid under pressure may be admitted into the cylinder 86 at either side of the piston 88 as by means of pipes 89 and 90. As shown in Figs. 3 and 4 the clamping devices are released. Now if by the manipulation of a suitable valve, (not shown), pressure is admitted into the cylinder 86 through pipe 90 the piston 88 will be moved to the left (Fig. 3) and the cylinder 86, being slidably mounted in the cylinder 85, will, simultaneously with the movement of the piston, be moved to the right. This will cause the connecting rods 78 and 84 to be drawn toward each other which in turn will as hereinbefore described effect rotation of the shafts 73, 74 and 79, 80 thereby rotating the eccentrics 69, 70, 71, 72 and causing them to close the clamps on the rails 2. When it is desired to release the clamps pressure may be admitted through the pipe 89 which will cause all of the parts to be moved in the opposite direction and the clamping jaws to release the rails.

From the foregoing it will be seen that this invention provides a simple and efficient mounting for machine-tools whereby they may be moved from place to place and also fluid pressure actuated clamping devices for maintaining the machine-tool in any desired position. It will also be seen that through the action of the means disclosed for actuating the clamping devices, all of the clamps are actuated simultaneously and the equalizing devices insure that they will all function equally.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. In a machine tool, a base; a support therefor; a pair of clamps located in spaced relation on said base for securing the base to its support; an eccentric device for actuating each of said clamps to cause them to grip said support; a shaft carrying each of said eccentric devices; a rock-arm secured to each of said shafts; an equalizing bar pivotally connected to both of said rock-arms; an actuating member connected to said equalizing bar, and fluid pressure actuated means for shifting said actuating member.

2. In a machine-tool; a base; a track upon which the base is supported; a plurality of pairs of clamps for securing said base to its support, each of said clamps comprising a movable member having a jaw adapted forcibly to engage the underside of the head of said track; eccentric devices for shifting said movable members upwardly to cause them to grip said head; an equalizing device between the clamps of each pair; and fluid actuated means for simultaneously rotating all of said eccentric devices to actuate said clamps.

3. In combination with a machine tool, a base; a support for said base; means permitting said base to be moved on its support; a plurality of sets of locking devices adapted to secure said base against movement relative to its support; a fluid pressure motor for actuating all of said locking devices, said motor comprising a shiftable cylinder and a relatively shiftable piston therein, the two comprising an equalizing device; an operative connection between said cylinder and one of said sets of locking devices; an operative connection between said piston and another of said sets of locking devices; and equalizing means between the locking devices in each set.

4. In a machine tool, a substantially rectangular base; spaced rails upon which base is supported; a clamp device carried by said base adjacent each of its four corners to secure said base to said rails, said clamp devices being arranged in two connected pairs and each clamp device comprising a vertically movable slide block having jaw portions adapted to engage beneath the head of one of said rails, a rotatable eccentric element fitted within an aperture in said slide block, a rock-shaft sustaining each of said eccentric elements, a rock-arm secured to each of said rock shafts; an equalizing bar connected to the rock-arms of each pair of clamp devices; a fluid pressure motor supported by said base intermediate said equalizing bars, said motor comprising a shiftable cylinder operatively connected to one of said equalizing bars; a shiftable piston slidably mounted in said cylinder and operatively connected with the other of said equalizing bars; and means to admit fluid pressure into said motor.

5. In a machine tool, a base; a support therefor; a plurality of pairs of connected clamps for securing said base to its support: equalizing means between each pair of clamps; a cylinder supported by said base; a fluid pressure motor supported within said cylinder and comprising a second cylinder slidably mounted in the first named cylinder, a piston slidably fitted within the second cylinder; fluid pressure lines connected with said second cylinder at opposite ends of said piston; an operative connection between the second cylinder and one of said pairs of clamps; and an operative connection between said piston and the other of said pairs of clamps.

6. In a mobile drill, a base; wheels on said base; a track supporting said wheels; a plurality of clamps having portions movable upwardly and engaging beneath a portion of said track and cooperating with said wheels securely to lock said base against movement on said track; power means including rotatable eccentric devices for actuating said clamps; and means for equalizing the pressure applied by said clamps.

7. In a mobile drill, a base; wheels on said base; rails supporting said wheels; a plurality of clamping devices adapted for vertical engagement with the underside of the head of said rails and cooperating with said wheels to secure said base in adjusted positions along said rails; a shaft; a motor carried by said base and connected to rotate said shaft; eccentric devices secured to said shaft and rotatable therewith; and an operative connection between said eccentric devices and said clamps to actuate the latter by rotation of the former.

8. A mobile radial drill combining, a base;

a support therefor; a plurality of clamps located in spaced relation on said base for securing the base to its support, said clamps having jaws movable upwardly into clamping contact with said support; eccentric devices located remote from support and contacted with said clamp jaws for actuating said clamps; and a motor, movable with said base, connected to turn said eccentric devices to cause said clamp jaws to grip said support.

9. In a mobile radial drill, a substantially rectangular base; spaced rails upon which said base is movably supported; a clamp device carried by said base adjacent each of its four corners to secure said base to said rails, said clamp devices being arranged in two connected pairs and each clamp device including a vertically movable member having portions adapted to engage beneath the head of one of said rails; rotatable eccentric elements connected to shift said movable clamp members; a motor carried by said base connected to rotate said eccentric elements; and an equalizing device between the pairs of clamp devices.

10. In a mobile drill, a base; a support upon which said base is movably mounted; a plurality of clamp devices for securing said base to said support, said clamps being arranged in pairs and each clamp device including a member movable into engagement with said support; rotary eccentric means for shifting said movable members to set said clamps; power means carried by said base for rotating said eccentric means; and an equalizing device between the clamps of each pair.

11. In a mobile drill, a base; a support upon which said base is movably mounted; a plurality of clamps for securing said base to its support, each of said clamps comprising a head movable into engagement with an underside of said support; a rotatable eccentric device and a lever for moving said head into engagement with said support; and a power motor, carried by said base, connected to rotate said eccentric device.

12. In a mobile radial drill, a substantially rectangular base; a track on which said base is movably mounted; a plurality of clamping devices carried by said base, adjacent its four corners, and adapted to engage said track, securely to lock said base against movement during a drilling operation, each of said clamp devices including an element movable into locking engagement with said track; and a single actuator carried by said base and operatively connected with all of said clamp devices for simultaneously actuating the latter.

In witness whereof, I hereunto subscribe my name.

DAVID C. KLAUSMEYER.

CERTIFICATE OF CORRECTION.

Patent No. 1,875,016. August 30, 1932.

DAVID C. KLAUSMEYER.

It is hereby certified that error appears in the printed specification of the above numbered patent requiring correction as follows: Page 4, lines 6 and 7, claim 8, for "contacted" read connected; and line 46, claim 11, for "device" read devices; and that the said Letters Patent should be read with these corrections therein that the same may conform to the record of the case in the Patent Office.

Signed and sealed this 22nd day of November, A. D. 1932.

(Seal)

M. J. Moore,
Acting Commissioner of Patents.